(12) United States Patent
Rogren (10) Patent No.: US 11,084,220 B2
(45) Date of Patent: Aug. 10, 2021

(54) ELECTROPHOTOGRAPHIC MULTI-MATERIAL 3D PRINTER

(71) Applicant: KERACEL, INC., San Jose, CA (US)

(72) Inventor: Philip Eugene Rogren, Half Moon Bay, CA (US)

(73) Assignee: KERACEL, INC., San Jose, CA (US)

( * ) Notice: Subject to any disclaimer, the term of this patent is extended or adjusted under 35 U.S.C. 154(b) by 0 days.

(21) Appl. No.: 16/692,477

(22) Filed: Nov. 22, 2019

(65) Prior Publication Data

US 2020/0171752 A1 Jun. 4, 2020

Related U.S. Application Data

(60) Provisional application No. 62/775,279, filed on Dec. 4, 2018.

(51) Int. Cl.
| | |
|---|---|
| *B29C 64/386* | (2017.01) |
| *B29C 64/153* | (2017.01) |
| *B33Y 10/00* | (2015.01) |
| *B29C 64/20* | (2017.01) |
| *B33Y 50/02* | (2015.01) |
| *B33Y 40/00* | (2020.01) |
| *B33Y 30/00* | (2015.01) |

(52) U.S. Cl.
CPC .......... *B29C 64/386* (2017.08); *B29C 64/153* (2017.08); *B33Y 10/00* (2014.12); *B29C 64/20* (2017.08); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| 6,076,652 A | 6/2000 | Head, III |
| 2004/0081475 A1 | 4/2004 | Phillips et al. |

(Continued)

FOREIGN PATENT DOCUMENTS

| KR | 10-2017-0003935 A | 1/2017 |
| WO | 2017/156623 A1 | 9/2017 |

(Continued)

OTHER PUBLICATIONS

International Search Report and Written Opinion for PCT/US2019/055061 dated Jan. 2, 2020, 12 pages.

(Continued)

*Primary Examiner* — Christopher T Schatz
(74) *Attorney, Agent, or Firm* — NovoTechIP International PLLC (57) ABSTRACT

An electrophotographic three dimensional printer system, including at least one electrophotographic (EP) printing module employing multi-material EP printing technology. The printer system may also include one or more additional printer modules employing different patterning and deposition technology, such as powder bed and jetted binder technology. The EP printing module may be used to create a 3D object derived from a composite toner material that may comprise an engineering material treated with a triboelectric material. The composite toner material may be designed to undergo a post printing treatment wherein a triboelectric material may be separated from an engineering material and the engineering material may undergo a change.

19 Claims, 7 Drawing Sheets

(56) References Cited

U.S. PATENT DOCUMENTS

| | | | |
|---|---|---|---|
| 2008/0192093 A1 | 8/2008 | Pinard et al. |
| 2009/0226833 A1 | 9/2009 | Sato et al. |
| 2010/0038807 A1 | 2/2010 | Brodkin et al. |
| 2013/0075013 A1 | 3/2013 | Chillscyzn et al. |
| 2013/0075022 A1 | 3/2013 | Chillscyzn et al. |
| 2013/0077996 A1 | 3/2013 | Hanson et al. |
| 2013/0272746 A1 | 10/2013 | Hanson et al. |
| 2015/0227070 A1 | 8/2015 | Martin |
| 2016/0067922 A1 | 3/2016 | Voris et al. |
| 2016/0200084 A1 | 7/2016 | Hays et al. |
| 2017/0050379 A1 | 2/2017 | Houben et al. |
| 2017/0299973 A1 | 10/2017 | Frauens |
| 2018/0034038 A1 | 2/2018 | Rogren |
| 2018/0043619 A1 | 2/2018 | Kim et al. |
| 2018/0085993 A1 | 3/2018 | Biskop et al. |
| 2019/0375159 A1 | 12/2019 | Rogren et al. |
| 2020/0108553 A1 | 4/2020 | Rogren |

FOREIGN PATENT DOCUMENTS

| | | |
|---|---|---|
| WO | 2019/152797 A1 | 8/2019 |
| WO | 2019/236236 A1 | 12/2019 |
| WO | 2020/076734 A1 | 4/2020 |
| WO | 2020/117498 A1 | 6/2020 |

OTHER PUBLICATIONS

International Search Report and Written Opinion for PCT/US2019/062839 dated Feb. 7, 2020, 14 pages.
International Search Report and Written Opinion for PCT/US2019/031171 dated Jul. 17, 2019.

ELECTROPHOTOGRAPHIC MULTI-MATERIAL 3D PRINTER

PRIORITY

This application claims the benefit of U.S. Provisional Application Ser. No. 62/775,279, entitled "Electrographic Multi-material 3D printer," filed Dec. 4, 2018, which is incorporated by reference herein.

FIELD

The present disclosure relates to systems and apparatuses for electrophotographic, multi-material three-dimensional (3D) printing.

BACKGROUND

Three-dimensional (3D) printing has generated a high degree of interest in the potential for a faster and more economical manufacturing approach since the first patents were granted over 30 years ago. To date, however, that potential has largely gone unfulfilled. Today, the majority of 3D printers are used to make demonstration parts or non-functional prototypes, most from a plastic material that is chosen primarily for compatibility with the printer rather than the materials requirement of the final part.

Among the issues preventing wider acceptance of 3D printing as a real manufacturing method is the requirement of specific applications for specific materials compatible with these applications. Another issue is the need for enhanced precision in some sections of a part compared to the bulk of the part. With current technology, the need for enhanced precision forces the choice of a 3D printing technology capable of providing the required precision, which typically results in slower build rates than less precise methods. These slower build rates can have a significant cost impact on the final part if applied to the total volume of the part. The solution to both problems is the ability to employ printing techniques that are optimized for the materials needed for the application and for the precision needed for specific voxels within the part.

While jetted binder 3D printers are arguably the most efficient technology for creating a 3D printed object, one of its attributes, the ability to deposit relatively thick layers, limits its usefulness when precise thin layers are needed. Electrophotographic (EP) printing, while rapidly depositing large areas of powder, is restricted to layer thicknesses in the range of a few microns to a few tens of microns. The trade-off is that printed resolution is significantly finer than is possible with jetted binder printing.

While EP based 3D printers have been the subject of significant study and development, the approach has not been commercially deployed in significant breath. EP technology in 3D printing applications, as suggested above, offers limited deposition rates, which limit the economic practicality. Notwithstanding the relatively slow build rates possible with pure EP technology, EP based 3D printers face two other challenges which have limited their practicality. Specifically, EP technology's inability to employ multiple engineering materials, such as ceramics, metals and high-performance polymers presents a sever limitation in manufacturing applications. The other issue affecting the practicality of EP technology for 3D printing applications is the inability to accurately and reliably transfer printed layers to a stack more than around 1 mm thick.

SUMMARY

The basis for the present disclosure is fundamental color electrophotographic (EP) technology adapted to the use of engineering ceramic, metal and polymer materials for object creation. The printing materials (composite toners) may be engineering material treated with a coating of triboelectrically active material, such that the treated powder may be used as a toner. The coating of triboelectric material may also be engineered, with respect to volume and composition to act as a binder. The binder nature may allow the treated powder to be formed into a predetermined shape with sufficient robustness to be submitted to a secondary process such as sintering, in the manner of conventional ceramic and powder metallurgy processing. The triboelectric material may be decomposed during a heat treatment or sintering step and thus removed from the final object. The triboelectrically treated powder may further comprise one of two classes of materials: robust materials and fugitive materials.

Robust materials may be those that survive a high temperature post processing step, either maintaining their original chemical and physical properties, or as the products of a chemical or physical transformation associated with the high temperature process. Robust materials may consolidate as individual grains of the original or product material and fuse together in a solid-state or reactive liquid aided sintering.

Fugitive material are those that may be present as a robust mass at low temperatures to act as a temporary support or form holding material for robust materials until the robust materials are fixed in predetermined positions in contact with the fugitive material. Fugitive materials may remain in place until robust materials are endowed with sufficient strength and rigidity to maintain the predetermined configuration without the support of fugitive materials. The fugitive materials may be removed from the 3D printed object before, during or after a high temperature post processing step. The fugitive materials are designed be removed from the object at specific points in the creation process depending of factors such as the composition of robust material and intended post printing steps. The fugitive materials may also be designed to be removed from the object in the gaseous state prior to the full consolidation of the robust materials, thus allowing removal of the fugitive materials from a cavity within the structure of the 3D printed object with no communication to the outside or with only a tortuous communication with the outside. A fugitive material may also be designed to be removed leaving virtually no residue.

In one embodiment, a fugitive material may be converted from a rigid supporting material to a gas or colloidal suspension by the application of heat. In alternative embodiments, the conversion of a fugitive material from solid to gas or colloidal suspension may be accomplished by the application of electromagnetic radiation such as visible, UV, infrared or X-ray radiation, or by particle beams such as electrons. In another alternative embodiment, a fugitive material may be removed by conversion to a liquid. Conversion to a liquid may be accomplished by the application of a predetermined thermal flux or by the action of a solvent.

The EP 3D printer may be a multi-material capable EP module which may be designed to be included in a 3D printer system with one or more other printer modules. The one or more printer modules included in a 3D printer system may employ multi-material EP printing technology as described in the present disclosure. The one or more additional printer modules may employ different patterning and deposition technology, such as powder bed and jetted binder technology. In some embodiments, each of the multiple materials an EP printer module may apply to the creation of a 3D object may derive from a composite toner material that may comprise an engineering material treated with a triboelectric material. The composite toner material may be designed to undergo a post printing treatment wherein a triboelectric material may be separated from an engineering material and the engineering material may undergo a change. The change may be a change in apparent or absolute density, or a change in stoichiometry, or a change in crystallography, or a change in appearance or a change in some combination of the preceding properties. The engineering materials may be ceramic or metallic or polymeric in nature. The engineering materials may further be of crystalline or amorphous nature, or a combination of crystalline and amorphous.

In some embodiments, a single pass multi toner EP system comprising a plurality of complete individual EP engines may interface to a single receiver substrate. A receiver substrate may comprise a continuous belt of a composite nature to provide the conditions to affect a traditional electrostatic transfer of a toner material pattern from an optical photo conductor of an EP engine onto a non-conductive or semi conductive surface of a receiver substrate. A receiver substrate may further form a continuous loop, interfacing with each of the plurality of EP engines, such that each of a plurality of EP engines may transfer a predetermined toner pattern onto a receiver substrate. A receiver substrate may be driven continuously and sequentially into communication with each of the plurality of EP engines such that each one of the plurality of EP engines may sequentially transfer a toner pattern onto a single printed layer. After a toner pattern from the last one of a plurality of EP engines has been transferred onto a single unfused printed layer on a receiver substrate the receiver substrate may transport an unfused printed layer to a fusing apparatus to consolidate and set an unfused layer into a printed layer.

A printed layer may be transported via a receiver substrate to a transfer station where a printed layer may be transferred to a build plate of an assembly station or to the top of a stack of previously transferred printed layers.

A receiver substrate of the present disclosure may interface with a transfer loop, comprised of a composite material appropriate for selectively maintaining and canceling electrostatic adhesive forces that may hold a layer of electrophotographic composite toner materials in position on the transfer loop. A transfer loop may be comprised of several sections for modification of a printed layer of electrophotographic composite toner powder in preparation for transferring the printed layer to build station. During the interaction between the receiver substrate and the transfer loop, the printed layer will be transferred to the transfer loop.

A printed layer is created by deposition of composite toner material onto a receiver substrate from one or more of a plurality of EP engines. Transfer of composite toner powder from an EP Engine may be performed in a manner known in the art of EP printing, that is by providing a charge on a substrate opposite to the charge on the composite towner powder. Each EP Engine may deposit a predetermined portion of a printed layer, each in sequence as the plurality of EP Engines are positioned along a portion of a receiver substrate. In one embodiment, each EP engine may deposit a predetermined pattern of composite toner powder directly on an exposed surface of a receiver substrate, such that no portion of the printed layer is thicker than the thickness of a single layer of composite toner powder. In an alternative embodiment, each EP Engine may be controlled such that each subsequent EP Engine may deposit a predetermined pattern on a previously deposited pattern or directly on a receiver substrate surface. Predetermined composite toner patterns from each of the plurality of EP Engines may be coordinated such that a completed printed layer may be of uniform thickness. A printed layer may comprise a layer of one or more printed objects. In a printed layer with deposited composite materials for a plurality of printed parts, depositions for each printed part may be spaced apart from adjacent depositions for others of the plurality of printed objects. Space between adjacent printed object layers may be filled with a composite toner material designed to facilitate separation of adjacent printed objects.

After a printed layer has been fully created by deposition of composite toner powders from a plurality of EP Engines, it may be transported to a fuser to fuse composite toner powders together in a consolidated mass. In some embodiments, it may be desirable to compress the composite toner powder to an apparent density of >40% of the theoretical density of the composite toner powder. Compaction of the composite toner powder may be accomplished before, during or after fusing the composite toner powder, depending on the nature of the materials comprising composite towner powders.

In some embodiments, compaction of composite toner may be accomplished during engagement between a receiver substrate and a transfer loop. A compaction device may comprise drive wheels for a receiver substrate and a transfer loop wherein the drive wheels also serve as calender rolls, applying compaction pressure to the toner through the receiver substrate and transfer loop. This embodiment may also be provided with a fusing device within the receiver substrate/transfer loop interface.

In another embodiment, compaction of the composite toner may be accomplished by a compaction device located in coordination with a receiver substrate prior to interface of the receiver substrate with a transfer loop. A compaction device can include a roller, made up of a hardened metal material designed as a cylindrical tube. In other embodiments, the compaction device can include a compliant pressure cuff, or another device configured to apply a controlled pressure orthogonal to the plane of the deposited composite toner material and a carrier device. The compaction device can also include a settling device configured to provide vibration. The vibration of the compaction device can improve the distribution and compaction of the composite toner powder. In some embodiments, the compaction device can be configured to compact composite toner powder to a high density of at least 40% of the theoretical density of the composite toner powder.

A receiver substrate and a transfer loop may interface by being brought into parallel alignment separated by a thickness of a printed layer. As a printed layer is caused to move into an interface between receiver substrate and transfer loop by movement of the receiver substrate to which it is attached, the printed layer is brought into contact with the transfer loop on a surface of the printed layer opposite of its contact with the receiver substrate.

Transfer of a printed layer from receiver substrate to transfer loop may be accomplished by removing the charge holding the printed layer to the receiver substrate and providing a charge to the transfer loop that is biased in magnitude and sign to attract the composite powder. A printed layer is caused to move through and out of an interface between a receiver substrate and a transfer loop by coordinated movement of the receiver substrate and the transfer loop. After a printed layer is caused to move out of an interface between a receiver substrate and a transfer loop, it may be caused to move, by movement of the transfer loop to a transfer device where the printed layer may be caused to transfer from the transfer loop to a build plate or to a stack of previously transferred printed layers.

In an alternative embodiment the multi-material EP 3D printer may comprise a plurality of EP engines, a receiver substrate and a conditioning loop. A conditioning loop and a receiver substrate may interface by being brought into parallel alignment separated by a thickness of a printed layer. As a printed layer is caused to move into an interface between receiver substrate and conditioning loop by movement of the receiver substrate to which it is attached, the printed layer is brought into contact with the conditioning loop on a surface of the printed layer opposite of its contact with the receiver substrate.

A conditioning loop may comprise a continuous loop of flexible material. A conditioning loop material may comprise, but is not limited to, a metal, a metal alloy or a composite material. A conditioning loop may be provided with a compaction device and a fusing device.

In embodiments comprising a conditioning loop, a printed layer can be transferred directly from a receiving substrate to a build plate or a stack of previously transferred printed layers. A printed layer may be caused to transit the interface between a receiving substrate and a conditioning loop by coordinated movement of the receiving substrate and a conditioning loop. A printed layer may be transferred from a receiving substrate to a build plate or a stack of previously transferred printed layers by a transfer apparatus. A transfer apparatus can comprise a predetermined location on a receiver substrate and a transfer device.

Components comprising the multi-material EP Printer can be coordinated by a print station control unit which may be directed by a central computer unit. A central computer unit may coordinate the actions of a plurality of print stations and an assembly apparatus.

Printing techniques such as electrophotography are capable of printing large areas with very high precision very rapidly but are limited to printing very thin layers. The relatively low mass deposition rate of electrophotography and added complexity of electrophotographic systems render them unattractive for 3D printing where all voxels on an object are formed electrophotographically. In some embodiments, the printer module may be incorporated in a system of a plurality of printer modules to form a multi-method 3D printer system. In this way, printed layers designed to be relatively thick (greater than ~20 μm) but relatively low resolution, may be created with a printer module provided with printing technology well suited for printing layers thicker than ~20 μm, such as powder bed and jetted binder technology. The layers may also be less than ~20 μm thick and/or require high precision.

In some embodiments, the multi-materials and multi-method printer system is a system of printer modules, the printer modules being directed by a central computer system to coordinate the modules as necessary to deposit the proper material at the required precision to a single build location, while maximizing the overall build rate.

A multi-material, multi-method printer system is disclosed in U.S. patent application Ser. No. 16/595,265, which claims priority to U.S. provisional patent app. 62/742,505, the entireties of which are incorporated herein by reference.

DETAILED DESCRIPTION

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Definitions

To improve ease of understanding throughout this disclosure, certain definitions are provided below:

Printer module—A patterning and deposition system capable of creating a printed object on a carrier device.

Transfer device—An apparatus for moving a printed layer from an EP printed module to an assembly apparatus.

Assembly apparatus—A system capable of receiving printed objects from a plurality of transfer modules in such a way as to assembly printed layers and printed parts according to a predetermined design.

Printed part—A stack of printed layers, fused together to form a part conforming to a predetermined design.

Printed Layer—A layer one voxel thick comprising one or more printed objects, the printed objects conforming to the requirements of a specific printed part design Printed object—A layer of a single material, a single voxel thick and the horizontal design conforming to the design of predetermined location within a printed part.

Previously transferred objects—An assembly of printed objects, all but the topmost creating completed printed layers; the top most layer may not have all of the printed objects required by the printed part design.

The multi-material electrophotographic 3D printer of embodiments of the inventions is designed to create printed objects, printed layers and printed parts using combinations of materials not typically associated with electrophotographic (EP) printing. These materials may be high performance engineering materials designed specifically to meet the engineering requirements of the final printed part. These materials may include ceramic and metals as well as organic materials that may not exhibit triboelectric properties necessary for conventional EP printing. In addition to not possessing triboelectric properties, these materials may not be fusible in the manner of traditional EP materials, and thus not fixable in a robust mass by conventional EP fusers. These materials must be presented to the EP printer engine as a powder of controlled particle size, typically in the range of from 2 µm to 10 µm and must possess triboelectric properties tailored to the requirements of the EP engine's developer. While powders of the appropriate size are readily available in the desired material compositions, they may not possess the required triboelectric properties. In order to make otherwise non-triboelectric material usable in an EP printing process, the powders of the desired material may be coated with a triboelectric material suitable for the developer of the EP engine. Such coatings may be applied by techniques such as powder bed atomic layer deposition, or by molecular layer deposition, or by other techniques for coating powders that are known in the art. These triboelectrically enabled powders are referred to as composite powders.

There are a wide range of triboelectric materials that are appropriate for powder coating and cover the range of triboelectric charge from strongly positive to strongly negative. Examples of practical materials with positive charges include nylon, acrylic and quartz. Practical negatively charged triboelectric materials include silicones, Teflon (PTFE), vinyl and polypropylene.

Powder coatings may also impart fusing or adhesive properties to powders of otherwise non-fusible material to allow for fixing a layer of loose powder to a robust mass. Since many triboelectric materials are low melting point organic materials, it is possible and desirable for the triboelectric coating to also provide the fusing/adhesive property to allow fixing of the powder to a robust mass.

The multi-material, multi method 3D printer of embodiments of the invention comprises an arrangement of a plurality of printer modules. Each printer module may comprise a mechanism for creating a precise and robust printed object. Each 3D printed object may be comprised of a predetermined material and conform to a predetermined set of physical requirements. Each one of the plurality of printer modules may communicate with one of a plurality of transport modules. Each one of the plurality of transport modules may comprise a carrier device upon which an associated printer module may form a 3D printed object or a printed layer. Each transport module may additionally comprise a transfer mechanism to transfer a printed object to an assembly apparatus. The assembly apparatus may comprise a build station and may additionally comprise a positioning apparatus to accurately position the assembly apparatus with respect to transfer mechanism.

A plurality of printed objects, each from the ones of a plurality of printer modules may be transferred to the assembly apparatus to form a 3D printed layer. A plurality of 3D printed layers may be sequentially stacked one upon the other to form one or a plurality of multi-material 3D printed parts.

The build station may be associated with a positioning apparatus for positioning the assembly apparatus relative to any designated one of the plurality of the transfer mechanisms.

Three-Dimensional Electrophotographic Printer

Figure 1:
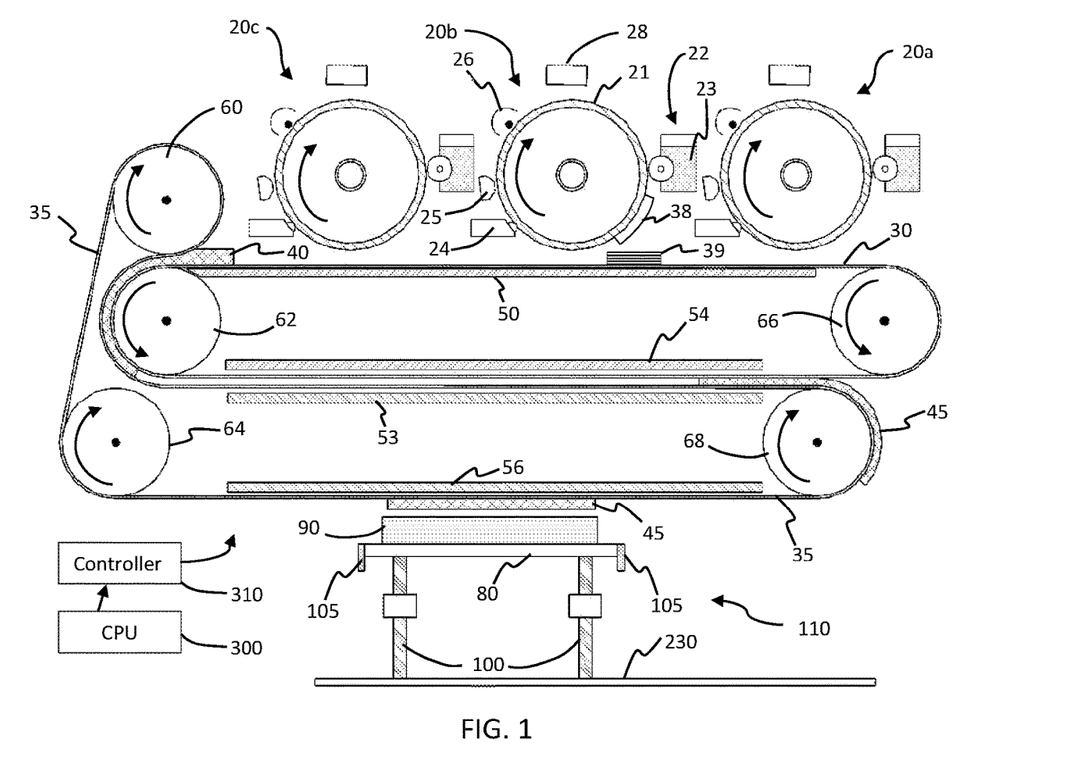
FIG. 1 is a block diagram of the major components of the multi materials EP printer in accordance with embodiments of the invention.
Figure 2:
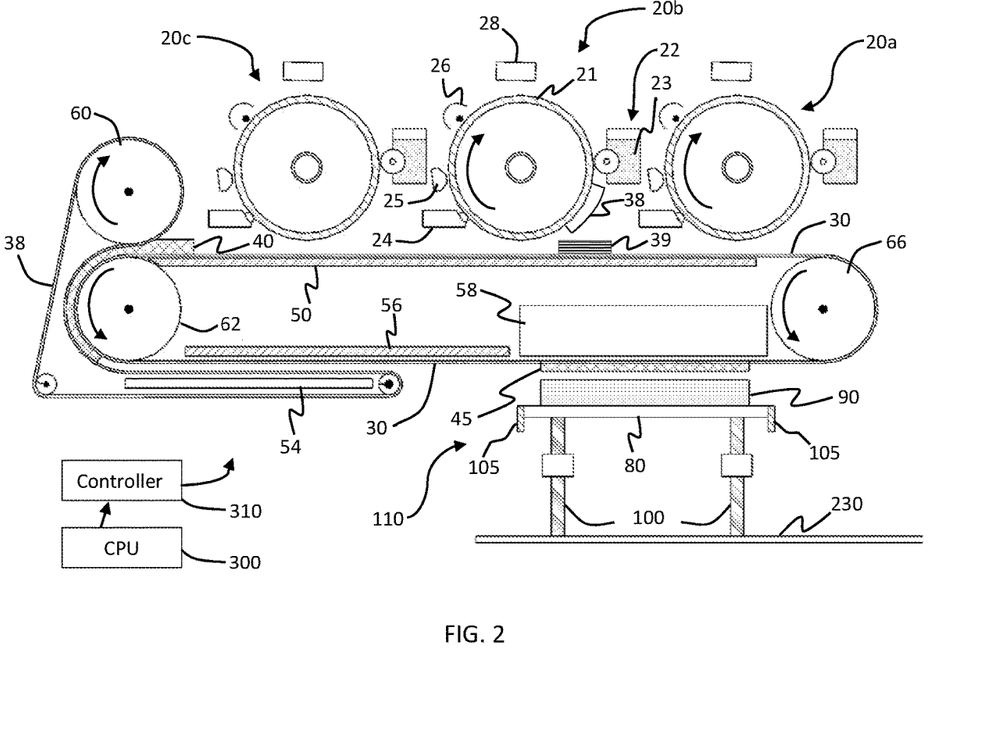
FIG. 2 is a block diagram of the major components of an alternative embodiment of the multi materials EP printer in accordance with embodiments of the invention.

FIGS. 1 and 2 illustrate three-dimensional multi-materials electrophotographic printer in accordance with embodiments of the invention. Each of the components function in coordination with the rest of the components as directed by a computer control system 10, illustrated in FIG. 8 and discussed in further detail hereinafter. In some embodiments, the computer system is directed by a CAD program which may contain all the information necessary for the central processing unit 300 to cause the plurality of components of the 3D multi-material, multi-method 3D printer to create the predetermined multi-material 3D printed part to be constructed.

Figure 9:
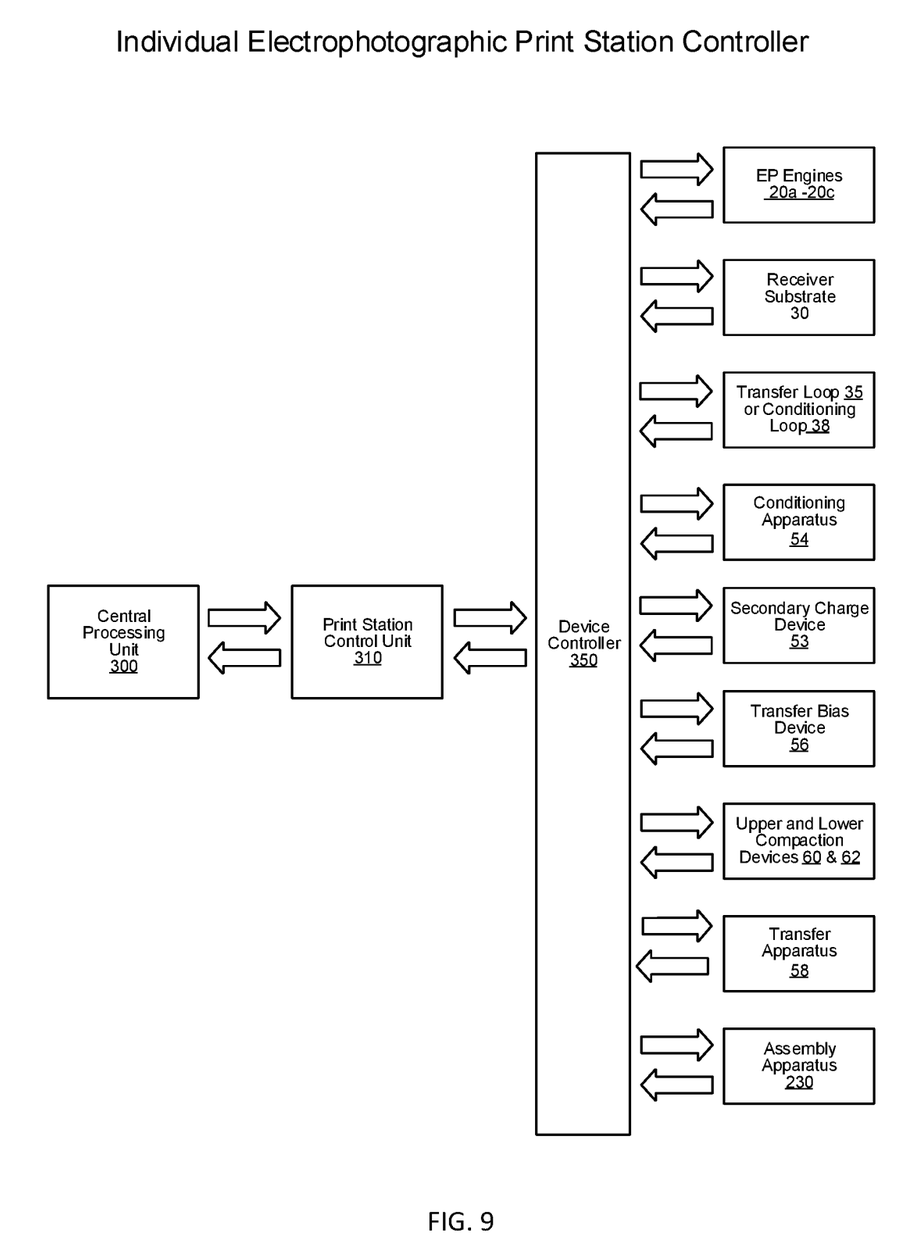
FIG. 9 is a block diagram of a print station control system of an EP printer in accordance with embodiments of the invention.

The print stations incorporated in the multi-material multi-method 3D printer system may be chosen for their capability to create printed objects of required physical characteristics in a predetermined material. In some embodiments, at least one of the plurality of printer modules incorporated in the printer system may be based on EP technology. FIG. 9 illustrates the logical association of the central processing unit to the individual components of an EP printer module in accordance with some embodiments of the invention, as disclosed in further detail hereinafter.

Each of the printer modules may be controlled by dedicated print station controller 310 and each printer control module may be coordinated by central processing unit 300 to create printed objects in a sequence appropriate for assembling printed layers and printed parts.

As shown in FIG. 1, the EP printer module comprises components to create a 3D printed object from a plurality of composite toner materials, conforming to a predetermined physical specification. An EP printer module may create a 3D printed layer on a receiver substrate 30. An EP multi-material printer module comprises a plurality of EP printer engines 20a-20c. Each one of the plurality of EP printer engines comprises a photoconductor drum 21, a developer 22, a drum cleaner 24, a discharge device 25, a charge inducer 25 and a imager 28. The listed components of each one of the plurality of EP printer engines is configured in a traditional arrangement of EP printer engines. Each of the plurality of EP printer engines may also comprise a reservoir of composite toner 23. Each of the reservoirs of composite toner 23 of the plurality of EP printer engines may be a different material. Each of the composite toners may be designed to be compatible with post printing processing designed to produce the final properties of all of the composite toners utilized in a multi-method printer system.

In the case of an EP printer module of FIG. 1 or FIG. 2, print station controller 310 may act on specific layer instructions from central processing unit 300 to create a printed layer of predetermined materials and patterns by controlling the actions of the components of the EP printer module. Specifically, print station controller 310 directs the actions of each of the plurality of EP engines to create a unique pattern of the composite toner with which each of the plurality of EP engines is loaded, and transfer the unique patterns to receiver substrate 30. In a first step, print station controller 310 may direct imager 28 of EP engine 20a to create an electrostatically charged pattern on photoconductive drum 21. As print station controller 310 causes photoconductor drum 21 to rotate past developer 22, appropriately charged triboelectric composite powder may be attracted to and deposited on the charged pattern on the photoconductor drum 21 of EP Engine 20a. As drum 21 of EP Engine 20a is further rotated by print station controller 310 to a point where a pattern of composite powder 23 approaches receiver substrate 30, print station controller 310 may cause receiver substrate 30 to advance in the same direction as the rotation of photoconductor drum 21 and at the same speed as the tangential movement of photoconductor drum 21 so that the pattern of composite powder may be transferred to receiver substrate 30. The transfer of the pattern of composite powder from photoconductor drum 21 to receiver substrate 30 may be affected by the charge induced in receiver substrate 30 by primary charge device 50 in the manner common to standard PE printers.

Once an unconditioned pattern 40 is deposited on receiver substrate by a first PE engine 20a, print station controller 310 may cause a pattern of composite powder to be formed one the photoconductor drum 21 of EP engine 20b in the same manner as the pattern of composite powder was formed on photoconductor 21 of EP engine 2a. Print station controller 310 may cause receiver substrate 30 and photoconductor 21 of EP engine 2b to advance to a point where index points on the pattern of composite powder 38 on photoconductor drum 21 of EP engine 20b and the pattern of unconditioned powder 39 on receiver substrate 30 are aligned in a direction orthogonal to receiver substrate 30. As print station controller 310 causes both the receiver substrate and the photoconductor drum 21 of EP 2b to advance at the same speed, the pattern of composite powder 38 on photoconductor drum 20 of EP engine 2b is transferred to open areas of the pattern of unconditioned powder 39 on receives substrate 30. The transfer of the pattern of composite powder 38 from photoconductor drum 21 to receiver substrate 30 may be effected by the charge induced in receiver substrate 30 by primary charge device 50 in the manner common to standard PE printers. The pattern of composite powder 38 from EP engine 20b may be such there is no overlap with the pattern of composite powder 38 formed on the photoconductor drum 20 of EP engine 20a.

Patterns of unconditioned powder 39, 40 from each of one of the plurality of EP engines 20 may be generated and transferred to receiver substrate 30 in the same manner as those from EP engines 20a and 20b until a complete printed layer, comprised of the materials required for the given printed layer are present in the predetermined voxels within the printed layer.

Figure 3:
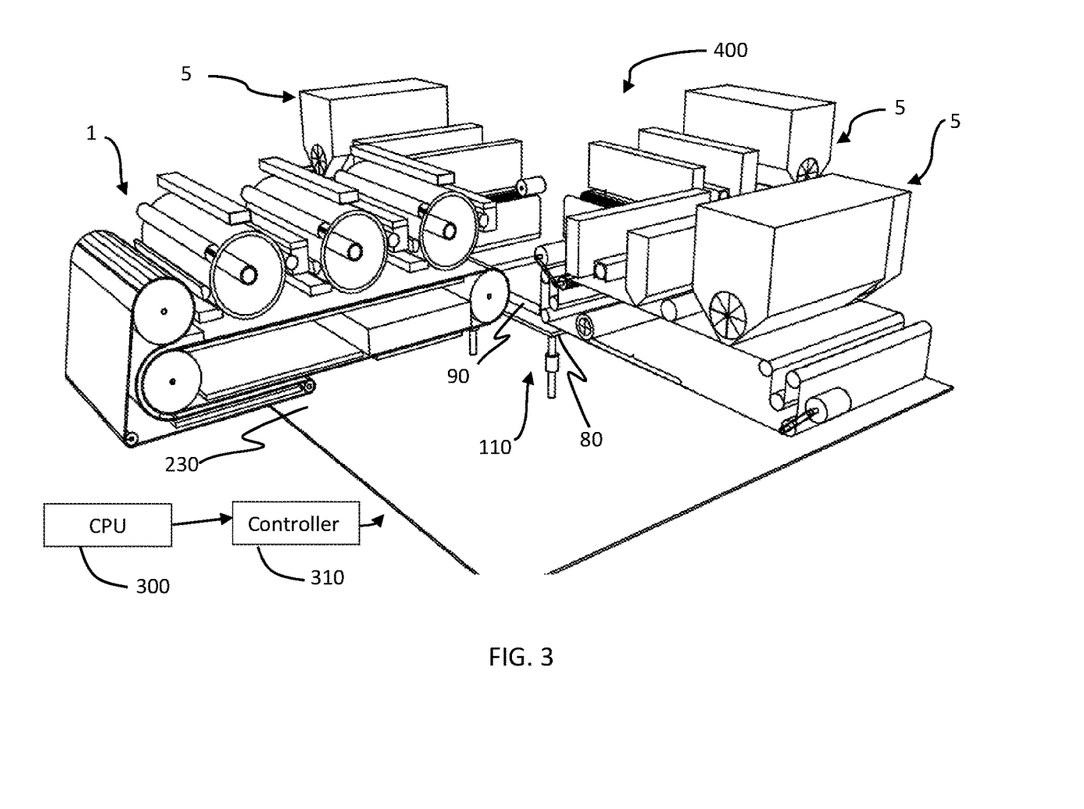
FIG. 3 is an illustration of an EP printer included in a multi method printer system in accordance with embodiments of the invention.

Each of the plurality of EP printer engines 20 may create and transfer an image to a receiver substrate 30 in a manner normally employed in EP printers. A receiver substrate 30 may be comprised of electrically semi-conductive composite material. Primary charge device 50 can be electrically biased with a potential having a magnitude and sign that electrostatically attracts the layers of composite toners 23 from the surface of photoconductive drums 21. Receiver substrate 30 may be a continuous loop, defined at a proximal end by drive wheel 66 and at a distal end by lower compaction device 62. The length of receiver substrate 30 closest to the plurality of EP engines moves from the drive wheel 66 toward lower compaction device 62. The position of receiver substrate 30 may be coordinated by central processing unit 300 and print station controller 310 relative to each of the plurality of EP printer engines 20 such that each of the plurality of EP printer engines deposits a printed object coordinated in a predetermined manner with printed objects of every other EP engines comprising an EP printer module 1, as shown in FIG. 3.

With reference back to FIG. 1, after each of the plurality of EP printer engines deposits its predetermined portion of a printed layer, completing the deposition of all the composite toners of a printed layer, the receiver substrate may move the printed layer toward a compaction device. A compaction device may be comprised of lower compaction device 62, and upper compaction device 60. Lower compaction device 62 and upper compaction device 60 may be superposed in the manner of calender rolls. Lower compaction device 62 may act on an unconditioned pattern 40 of composite toner 23 through the thickness of receiver substrate 30. Upper compaction device 60 may act on an unconditioned pattern of composite toner 40 through the thickness of transfer loop 35. The coordinated interaction of upper compaction device 60 and lower compaction device 62, acting through the thicknesses of receiver substrate 30 and transfer loop 35, may compress the plurality of composite toners 23 to a density of greater than 40% of the theoretical density of composite toners 23. A compaction device may also comprise a thermal device to fuse the fusible portion of composite toners 23.

Transfer loop 35 may comprise an electronically semi-conducting, composite material the same as, or similar to receiver substrate 30. Transfer loop 35 moves in coordination with receiver substrate 30, separated from receiver substrate 30 by the predetermined thickness of printed layer 45 between lower compaction device 62 and transfer drive 68. Around lower compaction device 62, transfer loop 35 applies pressure to the compacted portion of printed layer 45.

Conditioning apparatus 54 may further condition printed layer 45 to facilitate transfer from receiver substrate 30 to transfer loop 35. Conditioning apparatus 54 may affect printed layer 45 by thermal, mechanical or radiation exposure. Conditioning apparatus 54 may also be electrically biased with a potential having a magnitude and sign that electrostatically repels printed layer 45.

Secondary charge device 53 can be electrically biased with a potential having a magnitude and sign that electrostatically attracts the printed layer 45 from the surface of receiver substrate to a surface of transfer loop 35. Transfer drive 68 can also be electrically biased with a potential having a magnitude and sign that electrostatically attracts the printed layer 45.

Transfer bias device 56 may be switchable in electronic bias from magnitude and sign to attract and hold printed layer 45, to electronic bias in magnitude and sign to repel a printed layer 45 from transfer loop 35. Transfer loop 35 may also be provided with a transfer device. Examples of such transfer devices are illustrated in FIGS. 4, 5, 6 and 7.

FIG. 2 illustrates an alternative embodiment of the EP printer. In the embodiment shown in FIG. 2, the transfer loop is replaced with a conditioning loop 38. Conditioning loop 38 is provided with a compaction device to compress the composite toners 23 of an unconditioned pattern 40.

As shown in FIG. 2, the compaction device includes a lower compaction device 62 and an upper compaction device 60. Lower compaction device 62 and upper compaction device 60 may be superposed in the manner of calender rolls. Lower compaction device 62 may act on an unconditioned pattern of composite toner 40 through the thickness of receiver substrate 30. Upper compaction device 60 may act on an unconditioned pattern of composite toner 40 through the thickness of conditioning loop 38. The coordinated interaction of upper compaction device 60 and lower compaction device 62, acting through the thicknesses of receiver substrate 30 and conditioning loop 38, may compress the plurality of composite toners 23 incorporated in unconditioned pattern 40, to a density of greater than 50% of the theoretical density of composite toners 23. A compaction device may also comprise a thermal device to fuse the fusible portion of composite toners 23.

Conditioning loop 38 may also be provided with a conditioning apparatus 54 which may improve the properties of printed layer 45 by the application of thermal, mechanical or radiated energy.

As shown in FIG. 2, transfer bias device 56 may be switchable in electronic bias from magnitude and sign to attract and hold printed layer 45 to electronic bias in magnitude and sign to repel a printed layer 45 from receiver substrate 30. Receiver substrate 30 may also be provided with a transfer device. Examples of such transfer devices are illustrated in FIGS. 4-7. Transfer bias device 56 may be incorporated in a transfer apparatus 58. Transfer apparatus 58 may comprise transfer device 76 as illustrated in FIGS. 4-7.

Roller Transfer Device

Transfer device 76 may be configured to transfer an EP printed layer 45 from receiver substrate 30 of FIG. 2 or transfer loop 35 of FIG. 1 by causing contact and a pressure between EP printed layer 45 and build plate 80 or the top of a stack of previously transferred printed objects 90.

Figure 7:
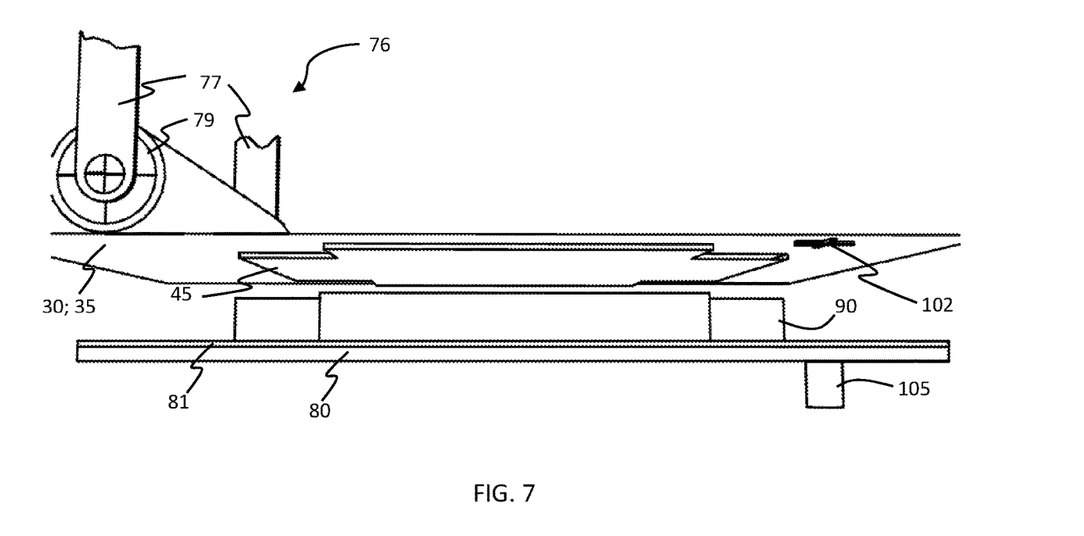
FIG. 7 is an illustration of a transfer device in accordance with embodiments of the invention.

In one embodiment of the transfer device 76 as shown in FIG. 7, the transfer device 76 includes a roller 79 and a carrier to support and move roller 79 vertically. In some embodiments, the carrier may be a two-axis carrier 77 to move roller 79 vertically and horizontally relative to receiver substrate 30 of FIG. 2 or transfer loop 35 of FIG. 1. Vertical movement of the two axis carrier 77 may deflect receiver substrate 30 of FIG. 2 or transfer loop 35 of FIG. 1 and cause printed object 91 to make pressure contact with build plate 80 or the top of a stack of previously transferred printed objects 90. A horizontal movement of two-axis carrier 77 may then cause a progressively moving line contact moving in a predetermined direction from a one end of printed layer 45 to another end of printed layer 45. The moving line contact across printed object 91 can transfer printed object 91 to build plate 80 or the top of a stack of previously transferred printed objects 90.

Adhesion Modifier Device

A transfer device 76 may further comprise an adhesion modifier device 74. The adhesion modifier device 74 may adjust the adhesion strength of printed layer 45 to receiver substrate 30 of FIG. 2 or transfer loop 35 of FIG. 1 to facilitate the release of printed layer 45 to build plate 80 or the top of a stack of previously transferred printed objects 90. The adhesion modifier device 74 may further modify the adhesion of printed layer 45 to the surface of build plate 80 or the top of a stack of previously transferred printed objects such that the adhesive strength between a printed layer 45 and receiver substrate 30 of FIG. 2 or transfer loop 35 of FIG. 1 is less than the adhesive strength between a printed layer 45 and build plate 80 or the top of a stack of previously transferred printed objects 90. Adhesion modifier device 74 may act upon the interface between carrier device 200 and printed object 91 by applying a stimulus to receiver substrate 30 of FIG. 2 or transfer loop 35 of FIG. 1, or printed layer 45, or both. The application of the stimulus can facilitate a reduction in adhesion of printed layer 45 to receiver substrate 30 of FIG. 2 or transfer loop 35 of FIG. 1. The stimulus causing an adjustment of adhesion from adhesion modifier 74 may be, but is not limited to a thermal stimulus, a radiation stimulus, a magnetic stimulus, a mechanical stimulus or a particle beam stimulus.

Pressing Device

Figure 5:
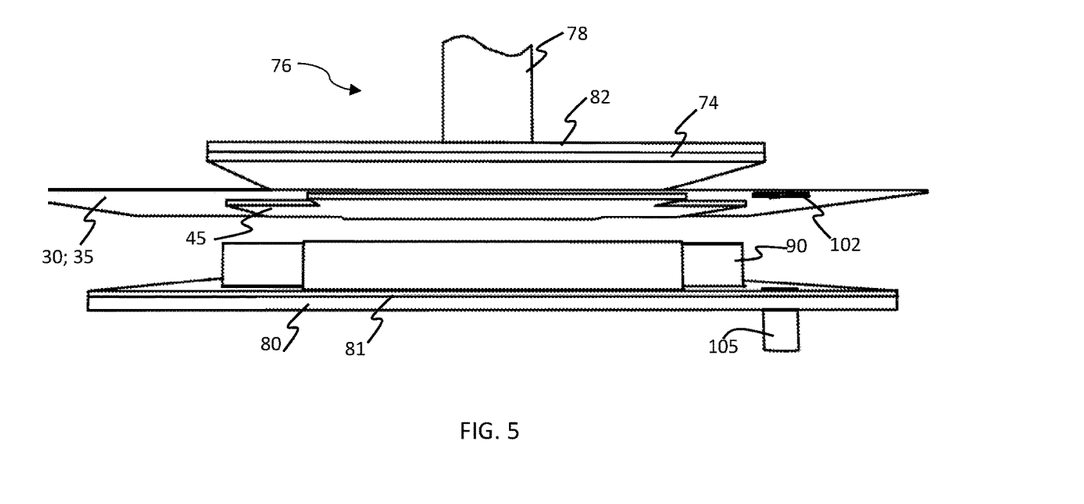
FIG. 5 is an illustration of a transfer device in accordance with embodiments of the invention.

In another embodiment, transfer device 76 may comprise a pressing device 82, as shown in FIG. 5. Pressing device 82 can be provided with single-axis carrier 78 to provide vertical movement of pressing device 82. The vertical movement of pressing device 82 may cause carrier device 200 to be deflected vertically and for printed layer 45 to come into contact, with a pressure, to build plate 80 or the top of a stack of previously transferred printed objects. The transfer device 76 of FIG. 5 may also comprise an adhesion modifier device 74 similar to the adhesion modifier device 74 of FIG. 7

Shape Modifier

Figure 4:
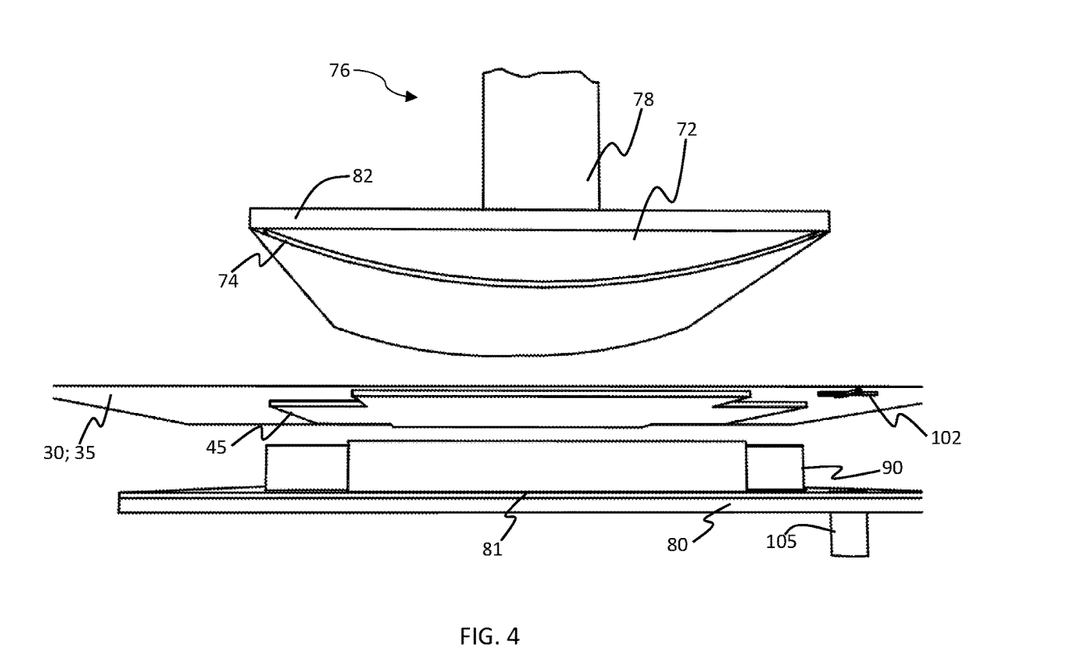
FIG. 4 is an illustration of transfer device in accordance with embodiments of the invention.

In another embodiment, as shown in FIG. 4, transfer device 76 may be provided with a pressing device 82 and a shape modifier device 72. Transfer device 76 of FIG. 4 can also be provided with a single-axis carrier 78 which may provide vertical movement of pressing device 82. The vertical movement of pressing device 82 may cause receiver substrate 30 of FIG. 2 or transfer loop 35 of FIG. 1 to be deflected vertically and for printed object 91 to come into contact, with a pressure, to build plate 80 or the top of a stack of previously transferred printed objects. Shape modifier 72 may comprise a preformed shaped structure which may be comprised of an elastic material that may be flattened by mechanical pressure applied normal to the shaped surface. As single axis carrier 78 brings printed object into contact with build plate 80 or the top of a stack of previously transferred printed objects 90, shape modifier 72 can progressively flatten and thus progressively bring printed object 91 into contact with build plate 80 or the top of a stack of previously transferred printed objects 90. The progressively moving contact between build plate 80 or the top of a stack of previously transferred printed objects 90 may assure a uniform attachment between printed object 91 and build plate 80 or the top of a stack of previously transferred printed objects 90. The transfer device 76 of FIG. 4 may also comprise an adhesion modifier device 74 similar to adhesion modifier device 74 discussed above.

Articulating Transfer Device

Figure 6:
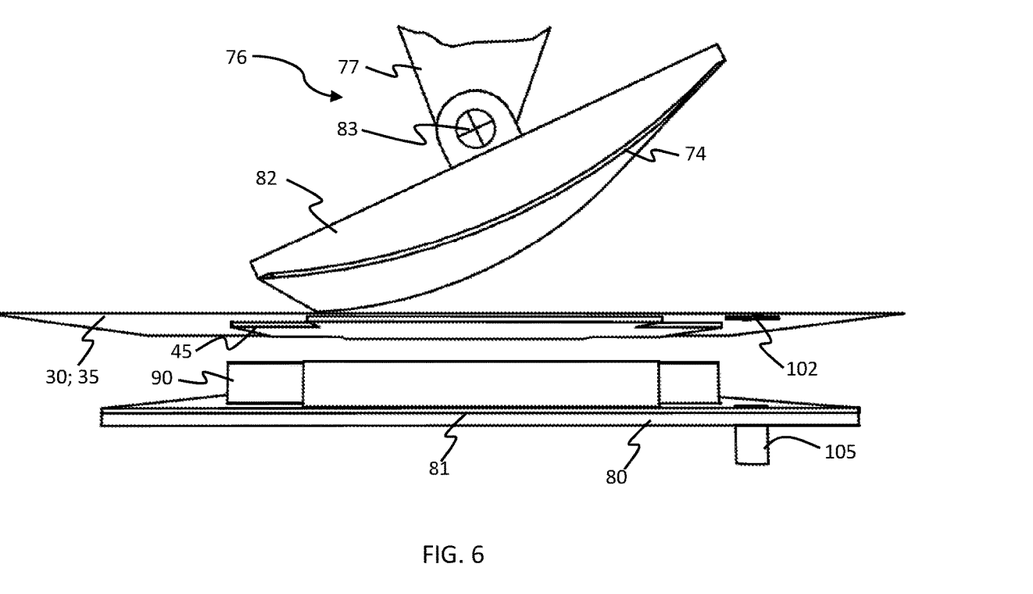
FIG. 6 is an illustration of a transfer device in accordance with embodiments of the invention.

In yet another embodiment, as shown in FIG. 6, the transfer device 76 may be provided with a shaped pressing device 84 and an articulating device 83. Transfer device 76 can also be provided with a two-axis carrier 77 which may provide horizontal and vertical movement of shaped pressing device 84. Under the control of computer system 10, the vertical and horizontal movement of shaped pressing device 84 may cause receiver substrate 30 of FIG. 2 or transfer loop 35 of FIG. 1 to be deflected vertically and for printed object 91 to come into contact, with a pressure, to build plate 80 or the top of a stack of previously transferred printed objects. Vertical movement of two-axis carrier may cause a predetermined end of shaped pressing device 84 to come into pressure contact with receiver substrate 30 of FIG. 2 or transfer loop 35 of FIG. 1, such that a predetermined end of printed object 91 is in contact with build plate 80 or the top of a stack of previously transferred printed objects 90. Coordinating further vertical and horizontal movement of two-axis carrier 77 with articulating device 83 can cause the entire shaped surface of shaped pressing device 84 to progressively come into line contact, with pressure, to receiver substrate 30 of FIG. 2 or transfer loop 35 of FIG. 1. The progressive line contact to receiver substrate 30 of FIG. 2 or transfer loop 35 of FIG. 1, may cause deflection of carrier device 200 to cause progressive line contact between printed layer 45 and with build plate 80 or the top of a stack of previously transferred printed objects 90. The progressive line contact between printed object 91 and build plate 80 or the top of a stack of previously transferred printed layer 45 being sufficient to transfer printed layer 45 to build plate 80 or the top of a stack of previously transferred printed objects 90. The transfer device 76 of FIG. 6 may also comprise an adhesion modifier device 74 similar to adhesion modifier device 74 discussed above.

Assembly Apparatus

An assembly apparatus, portions of which are illustrated in FIGS. 1-3, may comprise a X-Y positioner device 230 and a build station 110. Build station 110 may comprise a build plate 80. A Z axis positioner device 100 may be provided which may adjust the vertical position of build plate 80 to maintain the level of the top of previously transferred printed objects 90 at a predetermined vertical position to facilitate proper transfer of a printed layers 45 to build plate 80 or the top of a stack of previously transferred objects 90.

Adhesion Reducing Device

Build plate 80 may comprise an adhesion reducing device 68 to facilitate removal of the completed stack of printed objects from the build plate 80. The adhesion reducing device 68 shown in FIGS. 4-7 may be activated to reduce the adhesion of the stack of previously transferred objects 90 by an applied stimulus. The stimulus which may cause adhesion reducing layer 68 to release the stack of previously transferred objects 90, may be a thermal stimulus, a radiant stimulus, a magnetic stimulus a chemical stimulus or a mechanical stimulus.

Alignment System

With reference to FIGS. 1-7, build plate 80 may further comprise an alignment sensor 105. As shown in FIGS. 4-7, printed layer 45 may comprise one or more alignment fiducials 102 which may interact with one or more alignment sensors 105 to precisely align the printed object 91 with the build plate 80 or with the top of a stack of previously transferred printed objects. Alignment sensor 105 may interact with alignment fiducial 102 in the UV spectrum, or in the visual spectrum or in the IR spectrum or magnetically, or mechanically. In conjunction with computer system 10, alignment sensors 105 may detect the position of alignment fiducials 102 to within 0.01 mm of actual position and cause build plate 80 to be positioned within 0.01 mm of a predetermined position relative to alignment fiducials 102.

Assembly Apparatus Positioner

As shown in FIGS. 1-3, an assembly apparatus may comprise an X-Y positioner device 230 and a build station 110. Build station 110 may comprise a Z positioner device and build plate 80. Build station 110 may interact with build plate 80 and X-Y positioner device 230 to cause build plate 80, at the command of computer system 10, to be positioned to within 0.01 mm of a predetermined position relative to transfer device 58 of any one of the plurality of transfer devices comprising a multi-material multi-module printer system.

X-Y positioner device 230 can comprise a computer-controlled X-Y movement system. The movement system may be but is not limited to an orthogonally connected pair of linear actuators or a planar X-Y linear motor. Build station 110 may be in communication with the X-Y movement system such that build station 110 may be moved to any point within the limits of the X-Y positioner device 230. The X-Y movement system may be scaled such that assembly station 110 may be moved to, and accurately positioned to accept a printed layer transferred from transfer apparatus 58 of any of the plurality of transfer devices associated with the printer system. The X-Y positioner device 230 may further be scaled to allow assembly station 110 to move to an unload position, clear of all printer modules associated with the printer. The clearance from associated modules may be provided in the X-Y plane or by separation orthogonal to the X-Y plane. Build station 110 can further be provided with a rotational movement system to provide rotational alignment of build plate 80 with transfer device 58.

Hexapod

In another embodiment, precise location of build plate 80 may be provided by a hexapod that can provide movement along the X, Y and Z axis as well as rotation about at least one axis.

Assembly Apparatus

An assembly apparatus may be the integrating component of the multi-material, multi-method 3D printer, as shown in FIG. 3. An assembly apparatus may be provided with a plurality of receiving devices which may accommodate the mounting of printer modules and associated transfer modules. Receiving devices of an assembly apparatus may comprise mechanical attachment devices to physically associate printer modules and transfer modules with an assembly apparatus in a predetermined fashion. Receiving devices of an assembly apparatus may also be provided with logical attachment devices to integrate the printer module processing units with the central processing unit 300 of FIG. 1 and FIG. 2.

Multi-Method 3D Printer System

FIG. 3 illustrates one embodiment of a multi-method 3D printer system 400. FIG. 3 shows four printer modules and four transfer apparatus associated with an assembly apparatus. The four printer modules may all implement different patterning and deposition techniques. An EP printer module 1 is represented in some detail. Generic printer modules 5 may employ deposition and patterning techniques other than EP printing. Printer modules 5 may be chosen from printer modules employing deposition and patterning techniques such as, but not limited to powder bed and jetted binder, off-set printing, jetted material printing and selective laser melting.

FIG. 3 illustrates a printer system with four printer modules/transfer apparatus aligned at right angles to adjacent modules with their proximal ends toward the center of the X-Y positioner device 230. It is understood that this configuration is not limited to four printer modules A and could comprise as few as two printer modules, or three printer modules, or more than four printer modules. It is further understood that a printed part removal area may be provided by horizontal separation at any open space on X-Y positioner device 230 or may be provided by vertical separation of assembly station 110 from printer modules A and transfer modules B. It is further understood that alignment of adjacent modules may be parallel rather than orthogonal. Other configurations will be obvious to those skilled in the art.

As shown in FIG. 3, the multi-material multi-method 3D printer 400 includes a plurality of printer modules with associated transfer apparatus integrated by an assembly apparatus. Each printer module may be capable of adjustment of operating parameters such as print thickness, binder concentration, binder type, and material type. While adjustment of operating parameters may significantly affect properties of the final printed object, each printer module creates printed objects based on one specific method. A non-exhaustive list of examples of potential methods includes jetted binder printing, electrophotographic printing, off-set printing, and jetted material printing. The method to create a given printed object may be chosen based on the capabilities of the separate methods such as practical thickness range, minimum feature size, precision, and print rate. While most printing methods may be compatible with one or more material, the basic materials may require specific preparation for use with specific methods.

In practice, a multi-material, multi-method 3D printer may be configured with one printer module for each combination of printer method and materials required in the final manufactured parts. In one embodiment, at least one of the plurality of printer modules making up a multi-method 3D printer system may be quickly and easily replaced with another module, as required for a specific final part.

While the EP printer is illustrated as one of a plurality of printer modules in a multi-method 3D printer system 400; it will be appreciated that the multi-material EP printer may be deployed as a stand-alone device, creating complete 3D printed devices.

As explained above, embodiments of the present disclosure are directed to 3D printer systems comprises a plurality of printer modules that may each be associated with one of a plurality of transfer devices all of which may be coordinated with an assembly apparatus. A central computer system 300 may coordinate the operation of all the components of the 3D printer system. The plurality of printer modules may comprise printer modules employing at least two different deposition and patterning techniques and each one of the plurality of printer module may be configured to create printed objects of one material or multiple materials. Each printer module may create printed objects with a different material or some printer module may use the same material, or all of the printer modules of a 3D multi-method printer system may use the same material. Printer modules with associated transfer devices, may be configured to be easily joined with or removed from assembly apparatus, allowing for easy custom configuration of the printer to match the build requirements.

Pattern Generation

As described above, the EP 3D printing module is configured to create structures of one or more materials in complex three-dimensional patterns wherein the structure is built up in layers, each layer comprised of one or more materials. The pattern of each material in each layer may be generated in a manner similar to pattern generation for each layer of a conventional 3D printer. Specifically, the patterns for each layer may be derived from a slice of the whole structure through the use of CAD software like SolidWorks. Unlike conventional 3D printers, the computer system 10 may separate the pattern included in design file 320, input into computer system 10 via input device 330, of each layer into more than one material.

Material Types

The material types for printing may be broadly classified in two basic categories: robust materials and fugitive materials.

Robust materials are those that survive a post printing processing step to become the non-compressible voxels of the final printed part. The robust materials may survive a post processing step identical in composition and structure to the material as it was when printed. Examples of such materials include ceramics such as alumina that start as $Al_2O_3$ powder and survive a post printing sintering process as a high density mass of $Al_2O_3$, or a metal such as stainless steel alloy powder which survives a post printing sintering process as a solid mass with the same alloy content as it started with.

A robust material may also start as precursors of the final material. A post printing process may cause the precursors of a robust material to react to create a new chemical compound or to change the phase or to change crystal types of the precursors. An example of such a material is aluminum powder that may be converted to alumina during a post printing heat treatment in a controlled oxidizing atmosphere, or powdered glasses used in ceramming processes, where the glass is converted to a crystal during a sintering process.

A fugitive material is one that can occupy voxels within a printed part that are designed to be occupied by a gas or a vacuum immediately after a post processing step. A fugitive material may be comprised of a solid or semi-solid material during the printing process, and during the process of assembling printed layers into a printed part. During a post processing step, a fugitive material is converted into a format that can easily escape from a printed part such as a gas or a liquid. The result of including a contiguous mass of voxels of fugitive material within a volume of robust material is a cavity of a predetermined configuration, after a post processing step. The cavity may be in communication with the outside of the printed part via a predesigned passage or may be completely sealed. A sealed cavity may be occupied by a predetermined gas or a vacuum. Examples of fugitive materials include organic materials such as polyethylene or polyethylene oxide, which decompose into $CO_2$ and water at temperatures below 450° C., or carbon powders, which can be oxidized to $CO_2$ at substantially higher temperatures by controlling the heat treat atmosphere. As the fugitive materials are converted to gas, the gases may escape the structure prior to the robust materials sintering into a dense mass.

In some embodiments, the printing material is a composite electrophotographic toner. In some embodiments, the printing materials includes a functional material, a triboelectrically active material, and a binder material. In some embodiments, the functional material makes up at least 40% of the total powder volume; depending on the nature of the triboelectrically active material, it may make up any value or range of values between about 5% and 60% of the total powder volume; and, the binder will make up the remainder of the toner and may be any value or range between 0% and 55% of the total powder volume.

Functional materials are, first of all, robust materials that survive a post-printing thermal process. They could be just about any metal or ceramic or combinations of metals and ceramics (including glasses).

As discussed above, the triboelectrically active material may be one of the robust or fugitive materials discussed above.

Binders may be chosen from a very wide range of organic materials. In general, the binders are materials that can be changed from a liquid or gel to a solid to hold the individual powder grains in a predetermined position. The binders may be materials that can be converted from solid to liquid and back to solid, such as, for example, a wax. The phase change might be effected by exposure to heat or electro-magnetic radiation, or in rare cases, particles such as electrons. The binders may be chosen for their lack or presence of atoms other than the classic organic constituents (carbon, hydrogen, oxygen & nitrogen), since these other atoms may survive the thermal treatment or react with the functional materials during the thermal treatment. In some embodiments, the binder and triboelectric functions may be served by the same material (i.e., the binder and the thermoelectrically active material are the same material).

Process

The basic process for manufacturing a 3D printed part begins with a CAD file fully defining the structure, materials and specifications of the desired part. The part described in the CAD file may be sliced into print pattern layers, the thickness each layer determined by specifications for each position within the printed part, such as final thickness and pattern tolerance. Each layer may then be separated into regions that require different material. Printer control instructions for each of the regions of different material requirement may then be transferred from the design file 320 via input device 330 and central processing unit 300 and interface bus 360 to appropriate print station control units 310 of the EP printer system.

Figure 8:
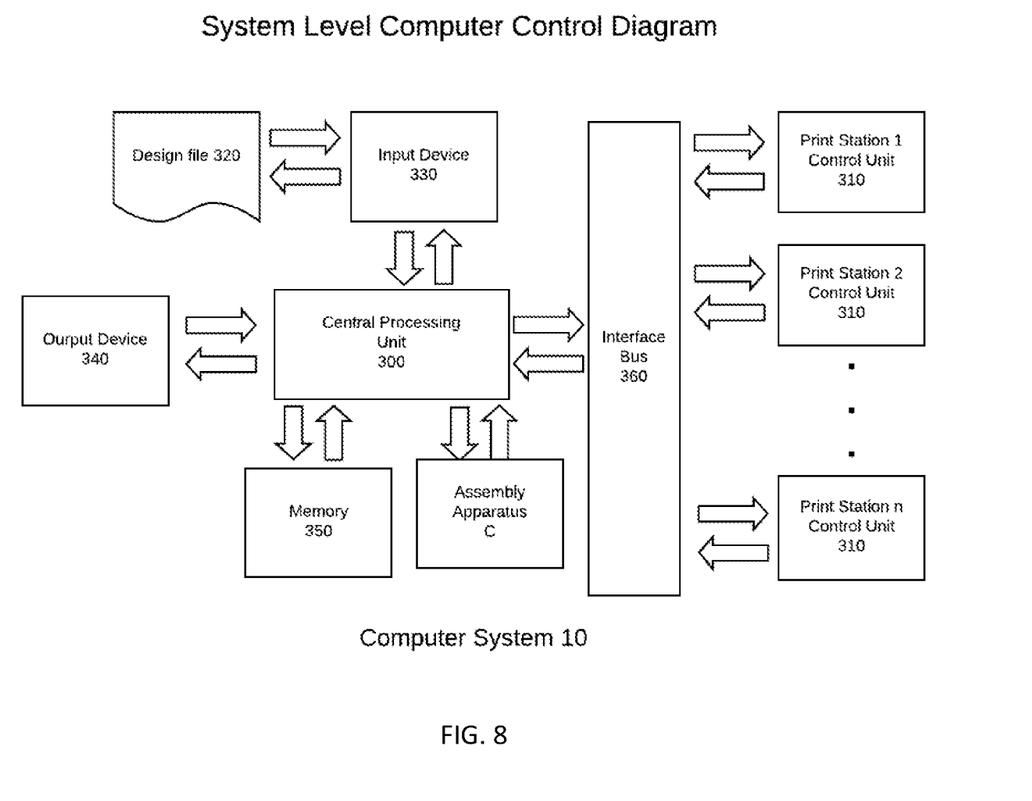
FIG. 8 is a block diagram of a computer control system of a multi-method printer system in accordance with embodiments of the invention.

With reference to FIG. 8, a central processing unit 300 may have the capability to generate printer control files and forward them via interface bus 360 to appropriate printer control units 310 for each printer module. The central processing unit 300 may also directly control an assembly apparatus 230 of FIG. 1 and FIG. 2, including causing the positioning of build plate 80, such that printed layers 45 may be transferred from receiver substrate 30 of FIG. 2 or transfer loop 35 of FIG. 1 in a predetermined sequence.

With reference to FIG. 1 and FIG. 2, a build sequence starts by providing materials appropriate for each of the EP engines 20 of the plurality of EP engines 20 of the multi-material 3D EP printer. Each one of the plurality of EP Engines 20 generates a printed object according to instructions received from control system 310 as generated by central processing unit 300. Each of the printed objects may be assembled into an unconditioned pattern 40 by the coordinated movement of receiver substrate 30 and EP engines 20, in succession as a receiver substrate moves from EP engine 20a to EP engine 20b and so on until an unconditioned pattern 40 is completed.

Conditioning of an unconditioned pattern 40 of composite toners 23 begins as receiver substrate 30 moves an unconditioned pattern 40 from the last EP engine into a compaction device and the interaction of a receiver substrate 30 and transfer loop 35 of FIG. 1 or conditioning loop 38 of FIG. 2.

The exact steps for conditioning a specific material may vary depending on the physical and chemical properties of the powder, and the target properties of the material after any post printing step. In the most common embodiments, conditioning may comprise a compaction step, to increase the density of the compacted powder to 40% to 70% of theoretical. In some embodiments, compaction may comprise a settling step such as a vibratory action may be applied to the powder to cause the powder particles to settle and pack together. In another embodiment compaction may comprise pressing the powders together with a force normal to the powder surface. Such a process is illustrated in FIG. 2 and FIG. 3 wherein upper compaction device 60 may be positioned above unconditioned pattern 40 and lower compaction device 62 may be positioned below receiver substrate 30, in direct alignment with upper compaction device 60, and a compacting force may be applied between upper compaction device 60 and low compaction device 62. Compaction of the powder may be carried with an upper containment device such as conditioning loop 38 or transfer loop 35, or without such a containment device. In another embodiment, compaction of unconditioned pattern 40 may comprise application of pressure normal to the surface of unconditioned pattern 40 by a pressure cuff.

Conditioning may also comprise an action to improve the properties of printed layer 45 such as robustness or uniformity or the ability of printed layer 45 to adhere to build plate 80, or to the top of the stack of previously transferred layers 90. Such an action may comprise heating or cooling printed layer 45, with conditioning apparatus 54. In a further embodiment the nature of conditioning apparatus 54 may be changed to suit a conditioning requirement of printed layer 45. For example, conditioning apparatus 54 may apply a radiation such a RF radiation, or X-ray radiation or ultraviolet radiation to effect a change in a property of a binder phase of unconditioned pattern 45, thereby controlling the physical properties of the printed layer 45. Printed layer 45 may be further conditioned by changing the electrostatic state of printed layer 45 to improve the ability to transfer printed layer 45 from transfer loop 35 or conditioning loop 38 to build plate 80, or to the top of the stack of previously transferred layers 90. Such a change may be affected by transfer bias device 56 by exposing printed layer 45 to an electrostatic field of a predetermined magnitude and polarity. Such an electrostatic exposure may cause the adhesion of printed layer 45 to be modified such that when printed layer 45 is brought into contact with build plate 80, or to the top of the stack of previously transferred layers 90, the adhesion of printed layer 45 to transfer loop 35 or conditioning loop 38 is lower than the adhesion of printed layer 45 to build plate 80, or to the top of the stack of previously transferred layers 90. Thus, the transfer of printed layer 45 to build plate 80, or to the top of the stack of previously transferred layers 90 may be facilitated.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A three dimensional (3D) printing system comprising:
    a plurality of printing modules, wherein at least one of the printing modules comprises an electrophotographic (EP) printing module;
    a transfer device to transfer an object to each of the plurality of printing modules;
    a plurality of controllers, each of the plurality of controllers coupled to one of the plurality of printing modules; and
    a computer coupled to the plurality of controllers to control the deposition of materials on the object in the plurality of printing modules
    wherein the EP printing module comprises:
        a plurality of EP printer engines, and
        a lower compaction device and an upper compaction device.

2. The 3D printing system of claim 1, wherein the EP printing module is configured to deposit a plurality of composite toner materials on the object.

3. The 3D printing system of claim 1, wherein each of the plurality of EP printer engines comprises:
    a photoconductor drum;
    a drum cleaner;
    a discharge device;
    a charge inducer; and
    an imager.

4. The 3D printing system of claim 1, wherein the EP printing module comprises a receiver substrate.

5. The 3D printing system of claim 4, wherein the receiver substrate comprises an electrically semi-conductive composite material.

6. The 3D printing system of claim 1, wherein each of the plurality of EP printer engines comprises a reservoir of composite toner.

7. The 3D printing system of claim 6, wherein each of the plurality of EP printer engine is electrically biased with a potential having a magnitude and sign that electrostatically attracts a layer of the composite toner.

8. The 3D printing system of claim 4, wherein the receiver substrate is a continuous loop.

9. The 3D printing system of claim 4, wherein the receiver substrate comprises a drive wheel at a proximal end and the lower compaction device at a distal end, and wherein the receiver substrate moves from the drive wheel toward the lower compaction device.

10. The 3D printing system of claim 4, wherein the position of the receiver substrate is controlled by the computer.

11. The 3D printing system of claim 4, wherein the lower compaction device acts on an unconditioned pattern of composite toner through a thickness of the receiver substrate, and the upper compaction device acts on an unconditioned pattern of composite toner through a thickness of a transfer loop.

12. The 3D printing system of claim 4, wherein the EP printing module further comprises a transfer loop.

13. The 3D printing system of claim 4, further comprising a conditioning apparatus to transfer from the receiver substrate to a transfer loop.

14. The 3D printing system of claim 4, wherein the transfer device further comprises a conditioning loop.

15. The 3D printing system of claim 14, wherein the conditioning loop comprises at least one of the lower compaction device or the upper compaction device to compress composite toner of an unconditioned pattern.

16. The 3D printing system of claim 15, wherein the lower compaction device acts on the unconditioned pattern of composite toner through a thickness of the receiver substrate and the upper compaction device acts on unconditioned pattern of composite toner through a thickness of the conditioning loop.

17. The 3D printing system of claim 1, wherein each of the plurality of printing modules uses a different deposition and patterning technique.

18. The 3D printing system of claim 1, wherein at least one of the plurality of printing modules is removable.

19. The 3D printing system of claim 1, wherein at least one of the plurality of printing modules is exchangeable with a different one of the plurality of printing modules.

* * * * *